(12) United States Patent
Tseng et al.

(10) Patent No.: US 12,519,039 B2
(45) Date of Patent: Jan. 6, 2026

(54) SENSING DEVICE AND MANUFACTURING METHOD THEREOF

(71) Applicant: Phoenix Pioneer Technology Co., Ltd., Hsinchu County (TW)

(72) Inventors: Chao-Tsung Tseng, Hsinchu County (TW); Che-Wei Hsu, Hsinchu County (TW)

(73) Assignee: Phoenix Pioneer Technology Co., Ltd., Hsinchu County (TW)

( * ) Notice: Subject to any disclaimer, the term of this patent is extended or adjusted under 35 U.S.C. 154(b) by 532 days.

(21) Appl. No.: 17/102,546

(22) Filed: Nov. 24, 2020

(65) Prior Publication Data

US 2021/0159151 A1 May 27, 2021

(30) Foreign Application Priority Data

Nov. 27, 2019 (TW) ................................ 108143107

(51) Int. Cl.
*H01L 23/495* (2006.01)
*G06F 30/398* (2020.01)
*G06V 40/16* (2022.01)

(52) U.S. Cl.
CPC ...... *H01L 23/49513* (2013.01); *G06F 30/398* (2020.01); *G06V 40/16* (2022.01); *H01L 23/49506* (2013.01)

(58) Field of Classification Search
CPC ............. G06F 30/398; H01L 23/49513; H01L 23/49506; H01L 23/5389; H01L 2224/18; G06V 40/166; G06V 40/16

USPC .......................................................... 438/118
See application file for complete search history.

(56) References Cited

U.S. PATENT DOCUMENTS

| 3,778,686 | A | * | 12/1973 | Galvin | .................... H01L 23/32 257/695 |
| 4,587,717 | A | * | 5/1986 | Daniele | .................... B41J 2/451 257/E33.049 |
| 5,132,563 | A | * | 7/1992 | Fujii | ................. H01L 27/11807 326/103 |
| 5,434,453 | A | * | 7/1995 | Yamamoto | .............. H01L 25/18 257/777 |
| 2004/0041185 | A1 | * | 3/2004 | Ireland | .............. H01L 21/76897 257/E21.507 |
| 2012/0105755 | A1 | * | 5/2012 | Zen | ..................... G02F 1/13452 257/91 |
| 2017/0263850 | A1 | * | 9/2017 | Ito | ........................ H01L 27/228 |

(Continued)

FOREIGN PATENT DOCUMENTS

TW I710123 B * 11/2020

*Primary Examiner* — Nathan W Ha

(57) ABSTRACT

A sensing device includes a sensing chip, which has an active face with a sensing region and a metal pad region having at least a metal pad thereon; a dielectric layer, which covers a periphery, back surface and a part of the active surface of the sensing chip, and the first face of the dielectric layer has an elevation higher than the active face of the sensing chip and exposes the sensing region of the sensing chip; a first conductive wire layer and a second conductive wire layer, which are disposed on the first and second faces of the dielectric layer respectively; a conductive pillar, which is disposed within the dielectric layer and connected to the first and second conductive wire layers; and a front-face fan-out circuit, which is connected to the first conductive wire layer and the metal pad of the sensing chip.

15 Claims, 12 Drawing Sheets

(56) References Cited

U.S. PATENT DOCUMENTS

2020/0035908 A1* 1/2020 Ku .......................... H01F 41/34
2021/0159151 A1* 5/2021 Tseng ................ H01L 23/49513

* cited by examiner

SENSING DEVICE AND MANUFACTURING METHOD THEREOF

CROSS REFERENCE TO RELATED APPLICATIONS

This Non-provisional application claims priority under 35 U.S.C. § 119(a) on Patent Application No. 108143107 filed in Republic of China on Nov. 27, 2019, the entire contents of which are hereby incorporated by reference.

BACKGROUND

1. Technical Field

This invention relates to a semiconductor device and manufacturing method thereof, in particular, to a sensing device and a manufacturing method thereof.

2. Description of Related Art

In the days of technological change, various sensing technologies have been widely used in the daily life. For example, the sensing device of mobile phone can be used for face recognition or 3D sensing. Among them, the sensing chip (or die) of sensing device is usually used for core sensing function, which can be integrated or embedded in the circuit board, so as to minimize the overall volume or thickness of the sensing device.

The sensing region shall be exposed when the sensing chip is integrated or embedded in the circuit board so that it can detect the external target. In other words, the conductive layer or dielectric layer shall not cover the sensing chip completely, but with an opening reserved at the corresponding position above the sensing region so that at least the sensing region can be exposed.

FIG. 1-1 is the cross-section view of the package structure of the sensing device 1 of the prior art. As shown in FIG. 1-1, the sensing device 1 includes a sensing chip 10 that has a positive pole area 11 and a negative pole area 12. The positive pole area 11 includes a sensing region 111 and a connection pad 112, wherein the sensing region 111 is adjacent to the active surface 101 of the sensing chip 10, and the upper surface of the connection pad 112 is flush with or concave in the active surface 101 of the sensing chip 10.

The sensing chip 10 is embedded in the dielectric layer 13 of the circuit board, with only its periphery and bottom surface covered by the dielectric layer 13, and the first surface 131 of the dielectric layer 13 is flush with the active surface 101 of the sensing chip 10. Therefore, the active surface 101 of the sensing chip 10 is not covered by the dielectric layer 13, so that the sensing region 111 can be exposed and a joint face 133 is formed between the periphery of the sensing chip 10 and the dielectric layer 13.

In addition, the conductive layer 14 is arranged or formed on the first surface (upper surface) 131 and the second surface (lower surface) 132 of the dielectric layer 13, with an opening 141 at the corresponding position above the sensing region 111 of the sensing chip 10 so that the sensing region 111 can be exposed. Thus, one of the conductive layers 14 will span the first surface 131 of the dielectric layer 13 and the active surface 101 of the sensing chip 10, and directly contact with the joint face 133 between the dielectric layer 13 and the sensing chip 10.

FIG. 1-2 is a partial enlarged view of the package structure shown in FIG. 1-1. Furthermore, as shown in FIG. 1-2, since the first surface 131 of the dielectric layer 13 is flush with the active surface 101 of the sensing chip 10, the joint face 133 between the dielectric layer 13 and the sensing chip 10 is prone to have a crack 134 under the action of stress or thermal expansion and contraction of the dielectric material. In addition, the etching solution may penetrate the joint face 133 and then erode to form a crack 134 either in the etching process.

Whether it is due to stress, thermal expansion and contraction of dielectric material or etching solution erosion, when there is a crack 134 between the dielectric layer 13 and the sensing chip 10, the conductive material will penetrate into the crack 134 to form an electrical connection path 142 in the subsequent step of forming the conductive layer 14 because the conductive layer 14 is directly across the crack 134 of the joint face 133. Since the thickness h1 of the positive pole area 11 of the sensing chip 10 is relatively small (far less than the thickness h2 of the negative pole area 12), the positive pole area 11 will be connected to the negative pole area 12 and result in a short circuit (or current leakage) as long as the electrical connection path 142 is slightly greater than h1, which will finally lead to the malfunction or damage of the sensing chip 10.

Furthermore, when the joint face 133 between the dielectric layer 13 and the sensing chip 10 is cracked or separated under the action of stress or thermal expansion and cold contraction of the dielectric material, and the overall structure of the sensing device 1 will have bending deformation.

In view of the above-mentioned technical problems in the prior art, it is necessary to propose an improved package structure so that the dielectric layer of the sensing device can be closely connected with the sensing chip, so as to avoid defects such as short circuit in the positive and negative pole areas of the sensing chip or the bending deformation of the sensing device.

SUMMARY OF THE INVENTION

Aiming at the technical problem that the joint face between the sensing chip and the dielectric layer is prone to be separated or cracked, the present invention provides the following technical scheme.

A sensing device of the present invention includes a sensing chip, a dielectric layer, a first conductive wire layer, a second conductive wire layer, at least a conductive pillar, and at least a first conductive circuit and at least a second conductive circuit. The sensing chip has an active surface with a sensing region and a metal pad region having at least a metal pad thereon. The dielectric layer covers a periphery, back surface and a part of the active surface of the sensing chip, and the first surface of the dielectric layer has an elevation higher than the active surface of the sensing chip and exposes the sensing region of the sensing chip. The first conductive wire layer and the second conductive wire layer are disposed on the first and second surfaces of the dielectric layer respectively. The conductive pillar is disposed within the dielectric layer and connected to the first and second conductive wire layers. The first conductive circuit is connected to the first conductive wire layer and the metal pad of the sensing chip, and the second conductive circuit is connected to the second conductive wire layer and the back side of the sensing chip.

Additionally, the manufacturing method of a sensing device of the present invention includes the following steps: providing a sensing chip with a relatively arranged active surface and a back surface, the active surface is provided with a sensing region and a metal pad region having at least a metal pad thereon (wherein the upper surface of the metal pad is flush with or concave in or convex in the upper surface of the active surface). An adhesive layer is disposed on the active surface of the sensing chip to cover at least the sensing region. The sensing chip is arranged on a carrier through the adhesive layer, of which an upper surface is bonded to the carrier. A dielectric layer is formed on the carrier to cover the periphery, back surface and a part of the active surface of the sensing chip, among which the dielectric layer is provided with relatively arranged a first surface and a second surface, the first surface is bonded to the carrier and is in common plane with the upper surface of the adhesive layer. The carrier is removed so that the first surface of the dielectric layer and the upper surface of the adhesive layer are exposed. A first conductive wire layer is formed on the first surface of the dielectric layer, and at least a first conductive circuit is formed between the first conductive wire layer and the metal pad of the sensing chip to connect them. A second conductive wire layer is formed on the second surface of the dielectric layer, and at least a second conductive circuit is formed between the second conductive wire layer and the back side of the sensing chip to connect the second conductive wire layer with the back side of the sensing chip. At least a conductive pillar is formed between the first conductive wire layer and the second conductive wire layer to connect these two layers. And the adhesive layer is removed to expose at least the sensing region of the sensing chip, wherein the first surface of the dielectric layer has an elevation higher than the active surface of the sensing chip.

With the above-mentioned technical scheme, the present invention can achieve the main technical effect that the dielectric layer can be closely combined with the sensing chip to overcome the technical problems of the prior art.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

FIG. 1-2 is a partial enlarged view of the package structure shown in FIG. 1-1.

FIG. 4-1 is a cross-section views of the sensing device according to the first embodiment of the present invention.

FIG. 4-2 is a partial enlarged view of the sensing device shown in FIG. 4-1.

FIG. 5-1 is a cross-section views of the sensing device according to the second embodiment of the present invention.

FIG. 5-2 is a partial enlarged view of the sensing device shown in FIG. 5-1.

DETAILED DESCRIPTION

Reference will now be made to the drawings to describe various inventive embodiments of the present disclosure in detail, wherein like numerals refer to like elements throughout.

Figure 2A:
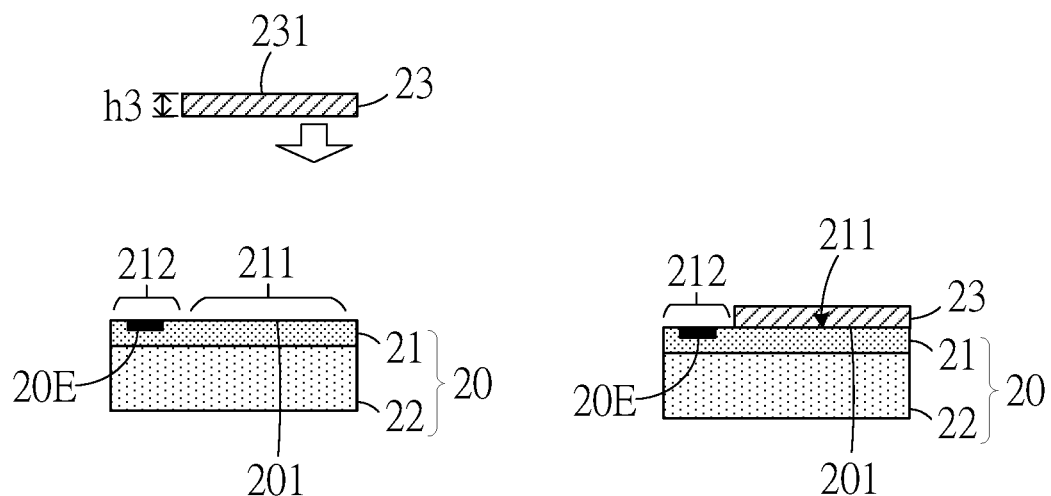
FIG. 2A to FIG. 2J are the cross-section views of a sensing device, which is cooperated with a manufacturing method of the sensing device, according to the first embodiment of the present invention.

FIGS. 2A-2J are the cross-section views of a sensing device 2, which is cooperated with a manufacturing method of the sensing device, according to the first embodiment of the present invention. First, as shown in FIG. 2A, step S1 is to provide a sensing chip 20, which includes a positive pole area 21 and a negative pole area 22. The active surface (upper surface) 201 of the positive pole area 21 includes a sensing region 211 and a metal pad region (or a metal electrode pad region or an electrode pad region) 212. The metal pad region 212 includes at least a metal pad 20E, of which the upper surface may be flush with, concave or convex in the upper surface of the active surface 201.

Then, step S2 is to attach or dispose an adhesive layer 23 on the active surface 201 of the sensing chip 20. The adhesive layer 23 has a thickness h3 ranging from such as 5 μm to 15 μm. In the first embodiment, the adhesive layer 23 only covers the sensing region 211 of the sensing chip 20, but does not cover the metal pad region 212 thereof.

Figure 2B:
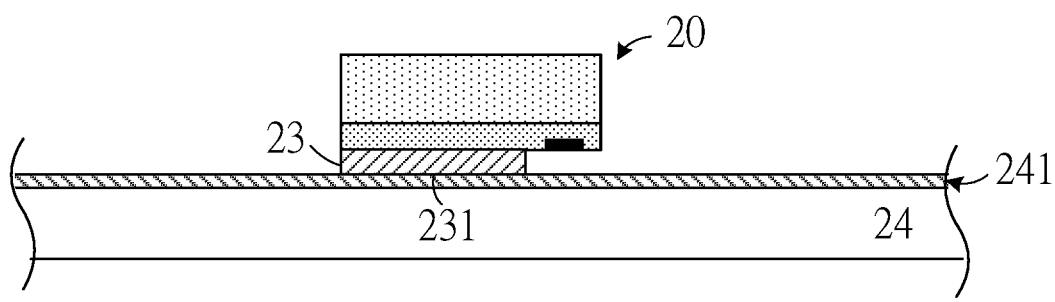

Then, as shown in FIG. 2B, step S3 is to overturn the sensing chip 20 and the adhesive layer 23 simultaneously in the vertical direction and then to dispose on or attach to the carrier 24. In other words, the sensing chip 20 is disposed on the carrier 24 through the adhesive layer 23, wherein the upper surface 231 of the adhesive layer 23 is connected to the carrier 24.

The carrier 24 may be made of material such as metal or ceramic, and its upper surface includes a release film or release layer 241. After the sensing chip 20 is disposed on the carrier 24, the adhesive layer 23 is arranged between the sensing chip 20 and the carrier 24, and the upper surface 231 of the adhesive layer 23 is bonded to the carrier 24, more precisely, to the release layer 241 of the carrier 24.

Figure 2C:
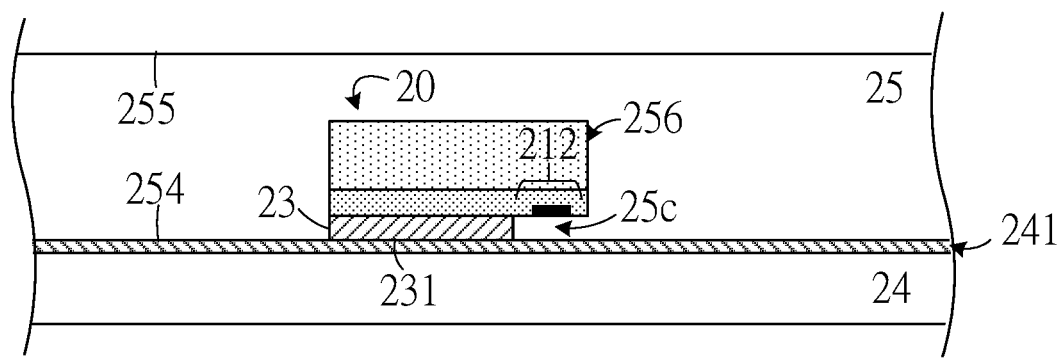

Then, as shown in FIG. 2C, the step S4 is to perform a molding process to form a dielectric layer 25 on the carrier 24. The material of the dielectric layer 25 is a molding compound, which may be, for example, a phenolic resin, an epoxy resin or a silicone resin.

The dielectric layer 25 is provided with a first surface 254 and a second surface 255 arranged relatively after the molding compound is solidified. The first surface 254 is bonded to the carrier 24, through which the first surface 254 of the dielectric layer 25 is coplanar with the upper surface 231 of the adhesive layer 23. The dielectric layer 25 covers the carrier 24 and the periphery of the sensing chip 20 (a joint face 256 is formed at the adjacent position), the back surface and the metal pad region 212, and a dielectric layer extension 25c is formed to cover the metal pad region 212 of the sensing chip 20. Thus, the joint face 256 will not be cracked thanks to the covering effect of the extension part 25c, so as to ensure the structural strength.

Then, a grinding process may be selectively performed to smooth the second surface 255 of the dielectric layer 25.

Figure 2D:
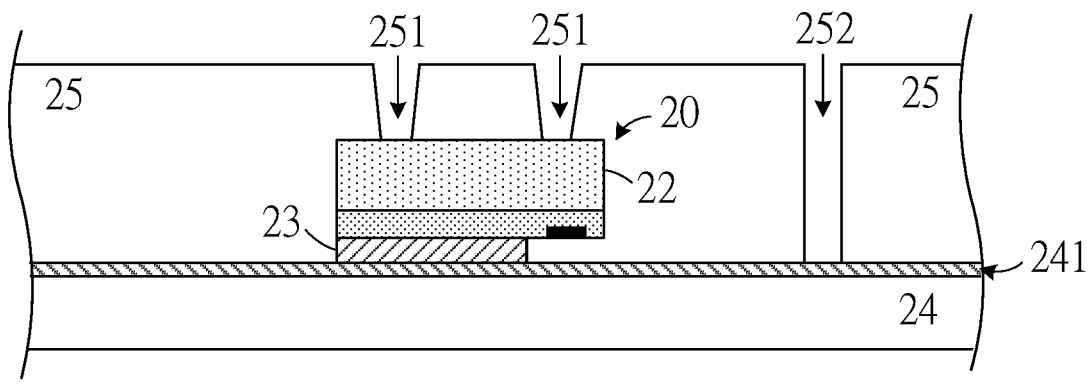

Then, as shown in FIG. 2D, step S5 is to perform a laser drilling or other etching processes, such as dry etch, to form at least a blind hole 251 and at least a via hole 252 in the dielectric layer 25. Only two blind holes 251 and one via hole 252 are shown in FIG. 2D. In other embodiments, other numbers of blind holes 251 and via hole 252 can be formed.

The blind hole 251 extends downward to the negative pole area 22 of the sensing chip 20 to expose a part of the back surface of the sensing chip 20 to the second surface 255 of the dielectric layer 25. Moreover, the via hole 252 goes throughout the entire dielectric layer 25 to connect the first surface 254 and the second surface 255 of the dielectric layer 25, and extends to the release layer 241 of the carrier 24.

Figure 2E:
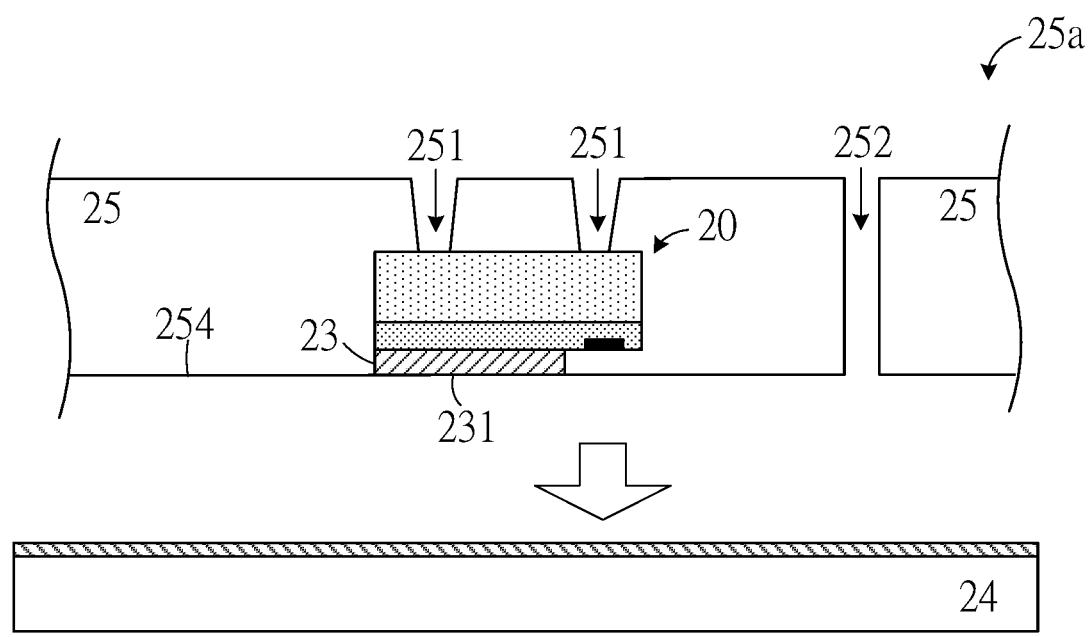

Then, as shown in FIG. 2E, step S6 is to separate the carrier 24 from the sensing chip 20 and the dielectric layer 25 so as to expose the first surface 254 of the dielectric layer 25 and the upper surface 231 of the adhesive layer 23. For convenience, the sensing chip 20, the adhesive layer 23 and the dielectric layer 25 after the carrier 24 is removed are collectively referred to as the stack structure 25a.

Figure 2F:
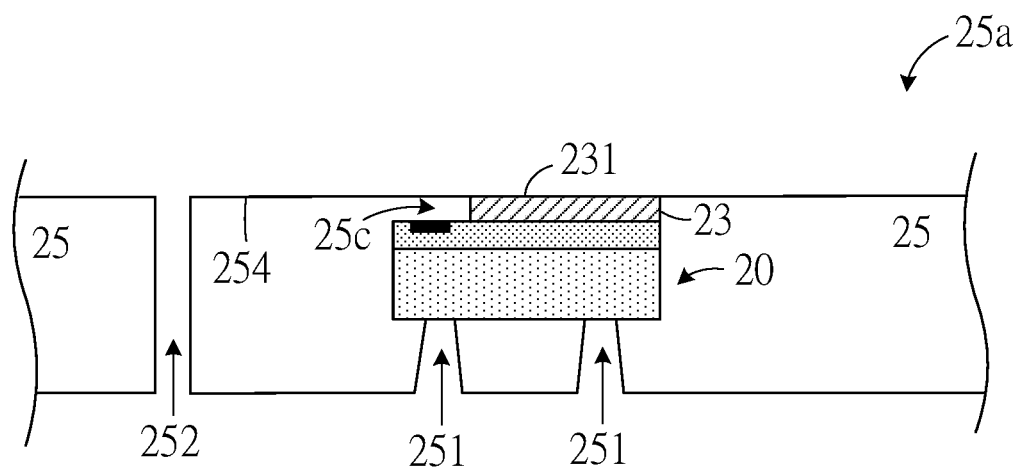

Then, as shown in FIG. 2F, step S7 is to overturn the stack structure 25a in vertical direction, in which the upper surface 231 of the adhesive layer 23 is coplanar with the first surface 254 of the dielectric layer 25.

Figure 2G:
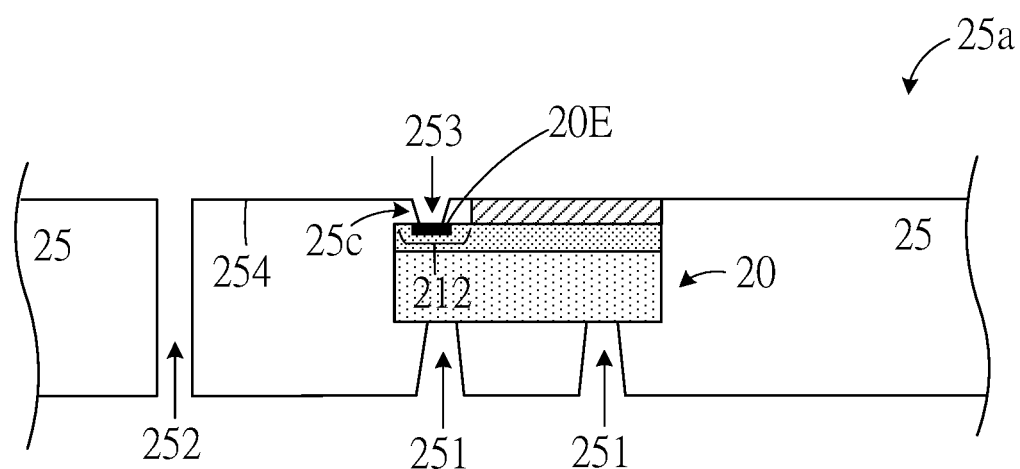

Then, as shown in FIG. 2G, step S8 is to perform a laser drilling process on the dielectric layer 25 to form at least a blind hole 253 at the corresponding position above the metal pad region 212 of the sensing chip 20. In other words, the blind hole 253 is formed on the extension 25c of the dielectric layer 25 that covers the metal pad region 212, and extends downward to the metal pad region 212 to expose the metal pad 20E of the metal pad region 212 to the first surface 254 of the dielectric layer 25.

Figure 2H:
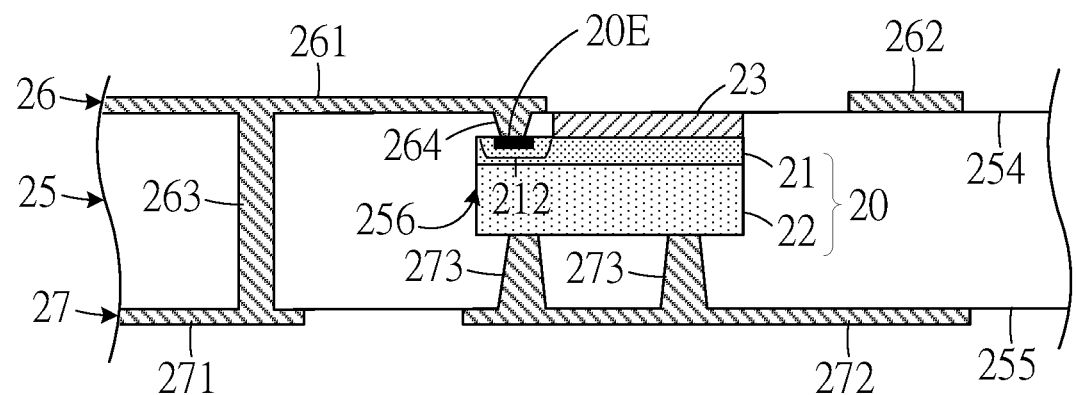

Then, as shown in FIG. 2H, step S9 is to perform an electroplating process to the first surface 254 and the second surface 255 of the dielectric layer 25 to form the first conductive wire layer 26 and the second conductive wire layer 27 respectively, both of which are patterned conductive layers with predetermined circuit patterns. At the sectional position shown in FIG. 2H, the first conductive wire layer 26 includes at least two separated parts 261 and 262, and the second conductive wire layer 27 includes at least two separated parts 271 and 272. In other embodiments, or at other sectional positions, the first conductive wire layer 26 and the second conductive wire layer 27 may also contain other numbers of mutually separated parts. In addition, the 261 and 262 of the first conductive wire layer 26 do not cover the adhesive layer 23.

Meanwhile, at least a first conductive circuit 291a is formed between the first conductive wire layer 26 and the metal pad 20E of the sensing chip 20, and at least a second conductive circuit 292a is formed between the second conductive wire layer 27 and the back side of the sensing chip 20.

A first conductive blind hole pillar 264 is also formed in the blind hole 253 through the above electroplating process, which serves as the front-face fan-out circuit of the positive pole area 21 of the sensing chip 20 to connect the metal pad 20E with the first conductive wire layer 26. Thus, the 261 of the first conductive wire layer 26 will not contact the joint face 256 between the dielectric layer 25 and the sensing chip 20 due to the supporting and blocking of the extension part 25c of the dielectric layer 25, so as to avoid the problem of diffusion coating and electrical short circuit. In addition, a second conductive blind hole pillar 273 is formed in the blind hole 251, which serves as the back-face fan-out circuit of the negative pole area 22 of the sensing chip 20 to connect the back side of the sensing chip 20 with the second conductive wire layer 27. Moreover, the extension 25c of the dielectric layer only exposes a part of the metal pad 20E. In other words, the joint face between the metal pad 20E and the positive pole area 21 is also covered by the dielectric layer 25, so there will be no problem of diffusion coating and electrical short circuit.

In addition, a conductive pillar 263 is formed in the via hole 252 in the above electroplating process to serve as a circuit between the upper and lower conductive wire layers to connect the second conductive wire layer 27 and the first conductive wire layer 26.

Figure 2I:
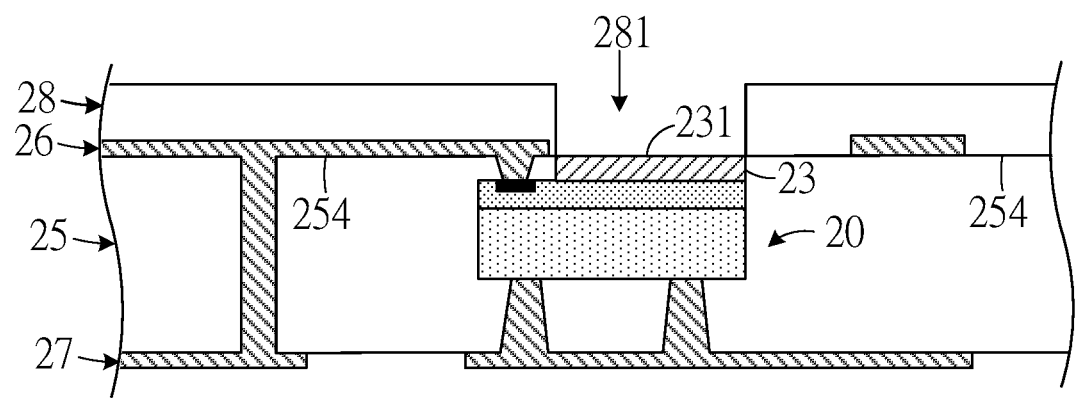

Then, as shown in FIG. 2I, step S10 is to form a protective layer 28 on the first conductive wire layer 26 to cover a part of the first surface 254 of the dielectric layer 25, which is provided with greater toughness and is not easy to be broken since it is made from soft materials such as polymer material or phosphorus containing material. Moreover, the protective layer 28 is provided with an opening 281 at the corresponding position above the adhesive layer 23 to expose the adhesive layer 23 so that it can be removed easily in the subsequent steps.

Figure 2J:
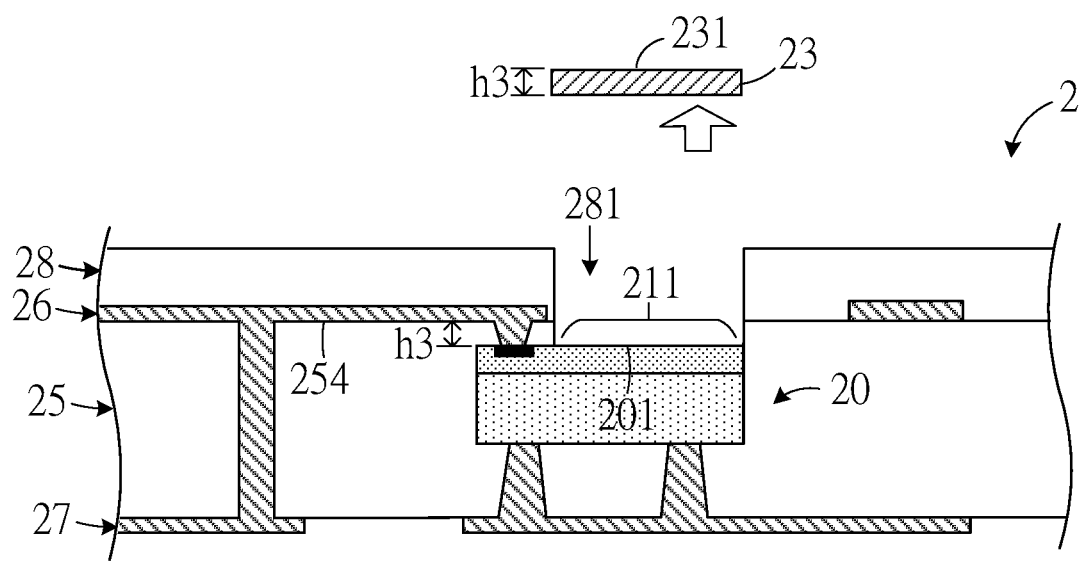

Then, as shown in FIG. 2J, step S11 is to remove the adhesive layer 23 so that the sensing region 211 of the sensing chip 20 can be exposed through the opening 281 of the protective layer 28. After the adhesive layer 23 is removed, the package structure of the sensing device 2 in the first embodiment is obtained.

It is to be noted that before the adhesive layer 23 is removed, the upper surface 231 of the adhesive layer 23 is flush with the first surface 254 of the dielectric layer 25 (as shown in FIG. 2I), and the adhesive layer 23 has a thickness h3. Therefore, after the adhesive layer 23 is removed, the first surface 254 of the dielectric layer 25 will have an elevation higher than the active surface 201 of the sensing chip 20, and the height difference between them is equal to the thickness h3 of the adhesive layer 23 (as shown in FIG. 2J).

The manufacturing method of the sensing device in the present invention is not limited to the first embodiment, and the manufacturing method of the second embodiment will be described as below.

FIGS. 3A-3H are the cross-section views of a sensing device 4, which is cooperated with the manufacturing method of the sensing device, according to the second embodiment of the present invention. The manufacturing method of the present embodiment is similar to that of the first embodiment, with the main difference in that the forming steps for the first conductive circuit 291b electrically connecting with the metal pad 20E of the sensing chip 20.

Figure 3A:
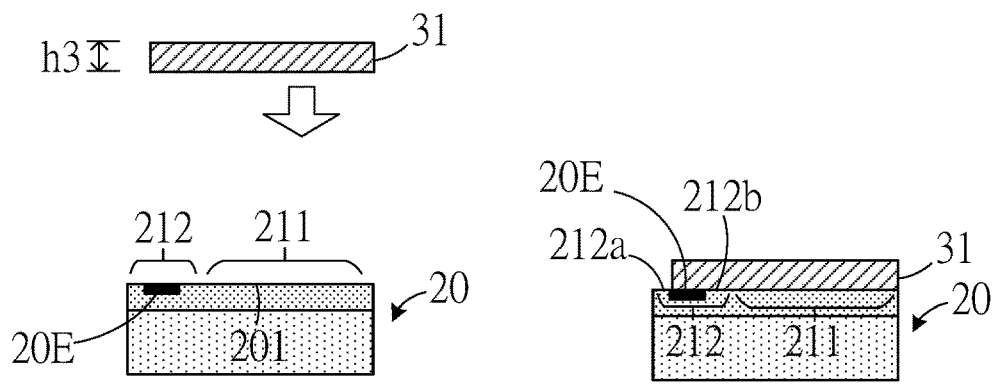
FIG. 3A to FIG. 3H are the cross-section views of a sensing device, which is cooperated with a manufacturing method of the sensing device, according to the second embodiment of the present invention.
Figure 3B:
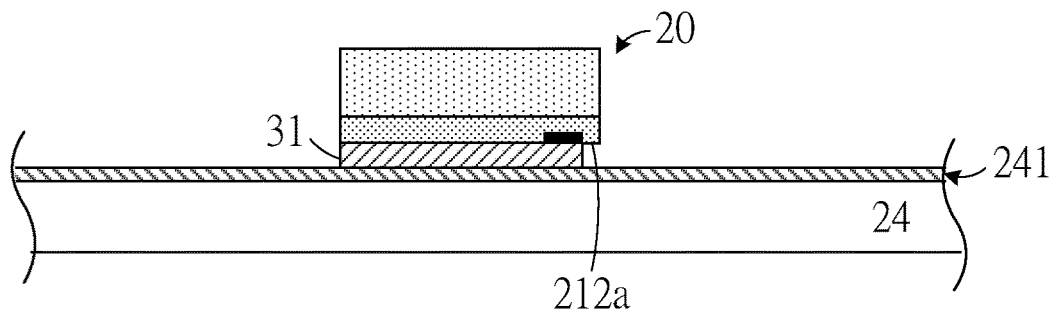
Figure 3C:
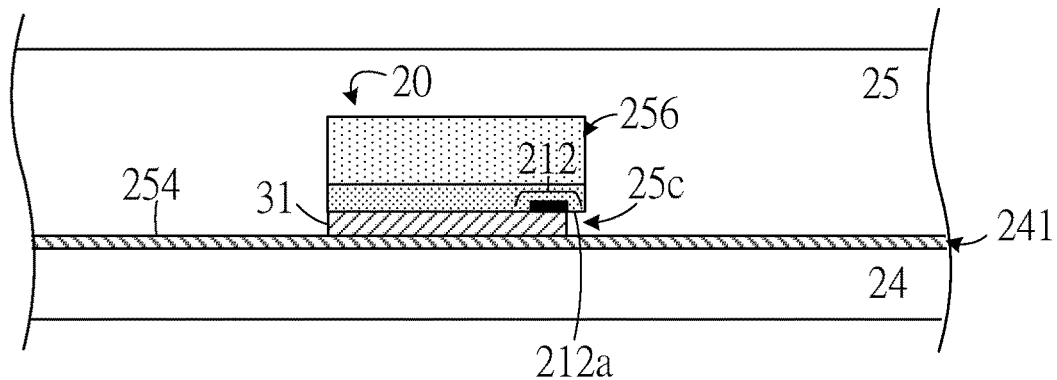

First, the steps shown in FIGS. 3A to 3C are similar to the corresponding ones in FIGS. 2A to 2C of the first embodiment, with the difference in that, as shown in FIG. 3A, the adhesive layer 31 of the present embodiment covers not only the sensing region 211 of the sensing chip 20, but also a part of the metal pad region 212. That is to say, the adhesive layer 31 covers the metal pad 20E and a part of the metal pad region 212 (hereinafter referred to as the molding area 212b) between the inner side of the metal pad 20E and the sensing region, and exposes the part between the outer side of the metal pad 20E and the edge of the upper surface of the active surface 201 (hereinafter referred to as the edging area 212a).

It should be noted that, as shown in FIG. 3A, the width of the adhesive layer 31 in the present embodiment is slightly smaller than that of the sensing chip 20. Therefore, the edging area 212a of the metal pad region 212 can still be exposed at one end of the adhesive layer 31, and as shown in FIG. 3C, the extension part 25c of the dielectric layer 25 can still cover the edging area 212a of the metal pad region 212 of the sensing chip 20 after the dielectric layer 25 is formed, so that the joint face 256 between the dielectric layer 25 and the sensing chip 20 will not be cracked thanks to the covering effect of the extension part 25c, so as to ensure the structural strength.

Figure 3D:
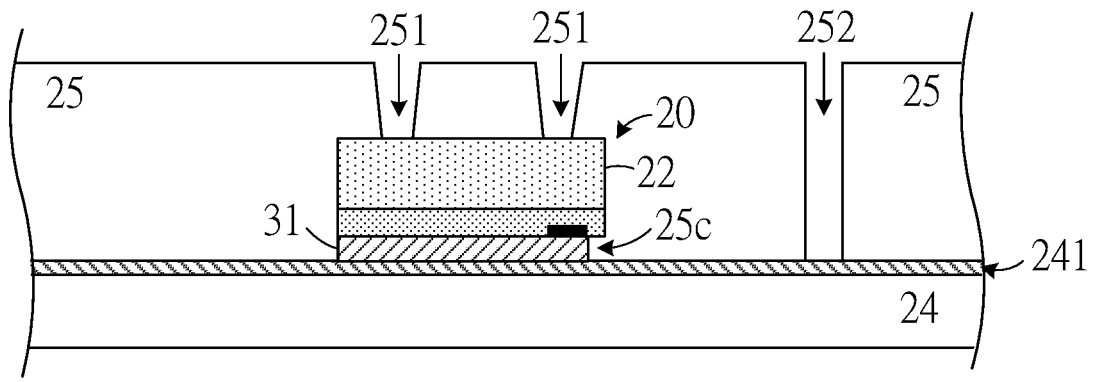
Figure 3E:
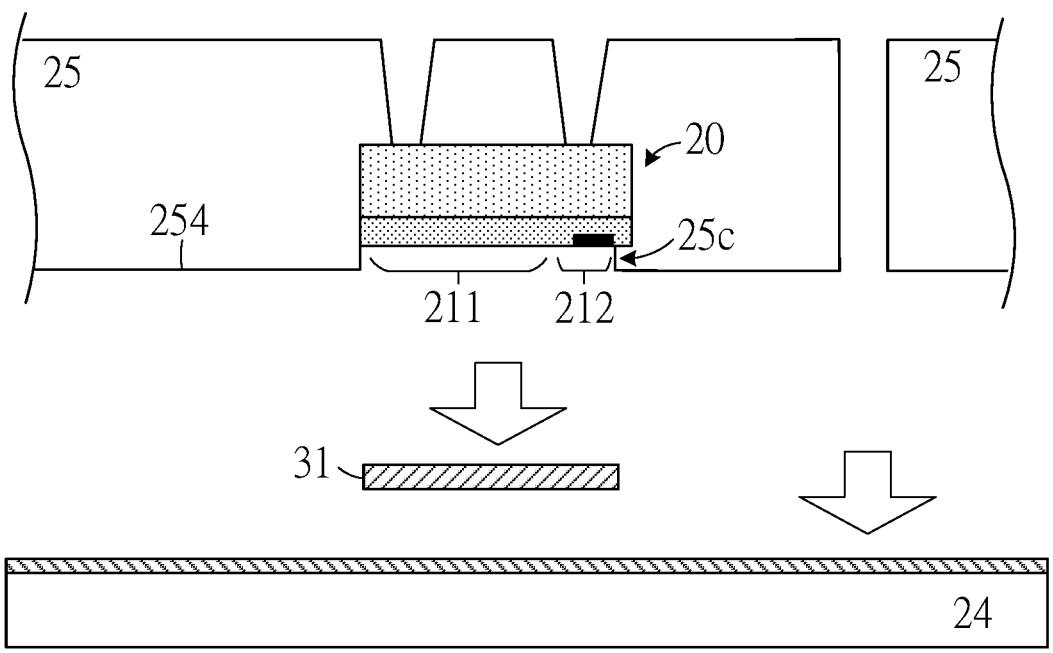
Figure 3F:
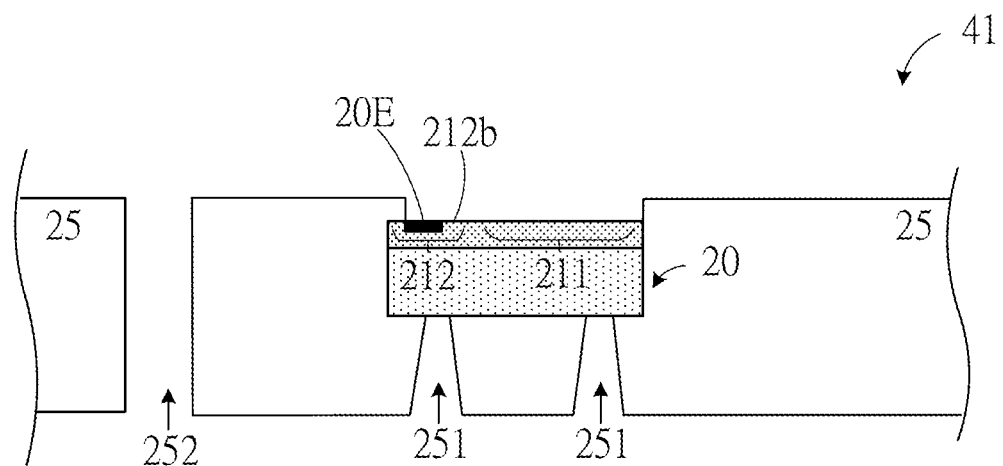

Then, the steps shown in FIGS. 3D to 3F are similar to the corresponding ones in FIGS. 2D to 2F of the first embodiment, with the difference in that, as shown in FIG. 3E, the adhesive layer 31 is removed at the same time (or immediately after) the carrier 24 is removed, so that the sensing region 211 and the metal pad region 212 of the sensing chip 20 are exposed (For the convenience of explanation, the sensing chip 20 and the dielectric layer 25 after the carrier 24 is removed are collectively referred to as the stack structure 41). Therefore, as shown in FIG. 3F, the sensing region 211, the metal pad 20E and the molding area 212b are exposed in the stack structure 41 that is overturned in vertical direction, so as to facilitate the formation of a first conductive circuit 291b in the subsequent step to electrically connect with the exposed metal pad 20E.

Figure 3G:
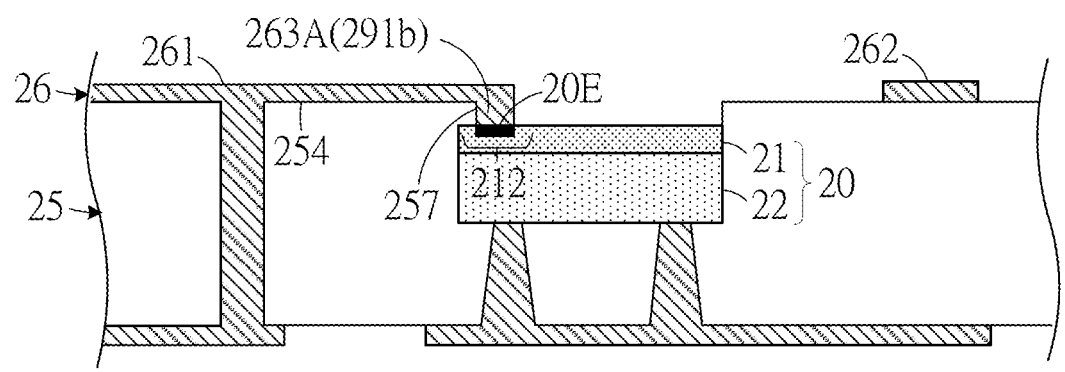
Figure 3H:
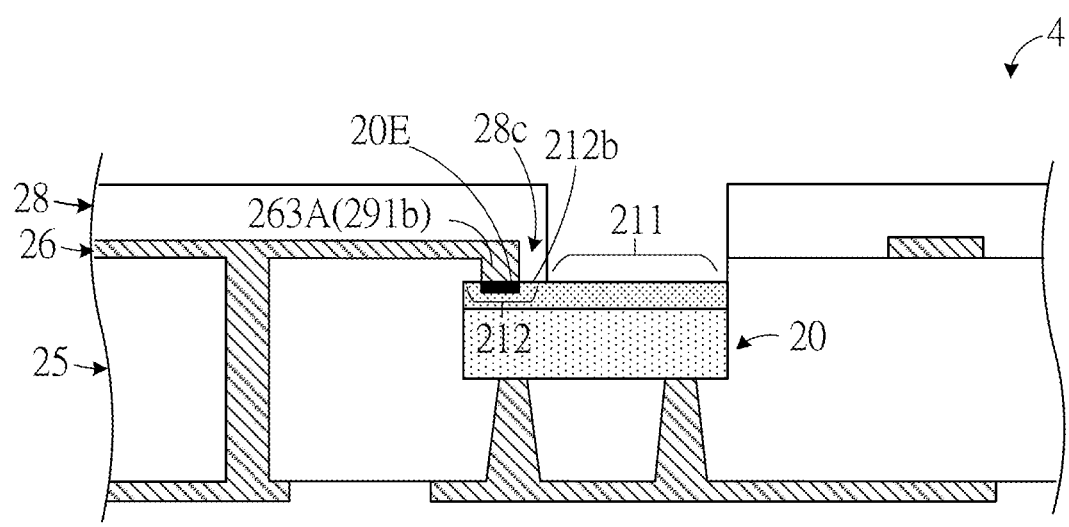

Then, the steps shown in FIGS. 3G to 3H are similar to the corresponding ones in FIGS. 2H to 2I of the first embodiment, with the difference in that, as shown in FIG. 3G, the conductive pillar 263A is formed by extending directly from the metal pad 20E along the side wall 257 of the extension part 25c of the dielectric layer 25 to the 261 of the first conductive wire layer 26 so as to serve as the first conductive circuit 291b of the sensing chip 20. In this way, the 261 of the first conductive wire layer 26 will not contact the joint face 256 thanks to the supporting and blocking of the extension part 25c, so as to avoid the problem of diffusion coating and electric short circuit. In addition, as shown in FIG. 3H, when the protective layer 28 is formed, the extension part 28c thereof also extends downward along the conductive pillar 263A to the molding area 212b of the metal pad region 212, and exposes the sensing region 211 of the sensing chip 20. After the protective layer 28 is formed, the package structure of the sensing device 4 of the second embodiment is obtained.

The manufacturing methods of sensing devices 2 and 4 in the first and second embodiments of the present invention are described above. The structural features of the package structures of the sensing devices 2 and 4 will be described as below.

Figure 1:
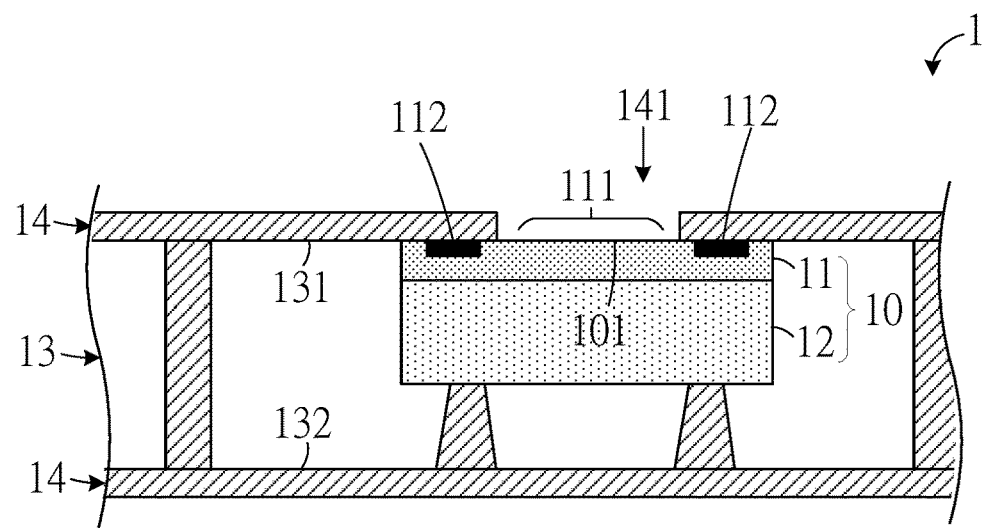
FIG. 1-1 is a sectional schematic diagram illustrating a prior art package structure of a sensing device.
Figures 1, 4:
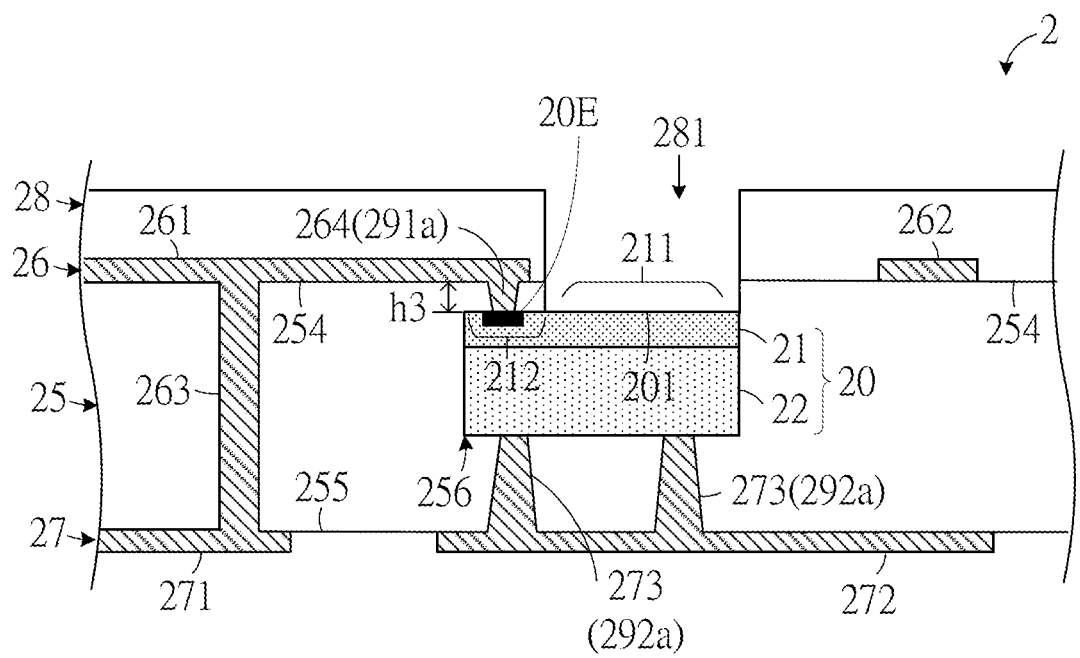
Figures 2, 4:
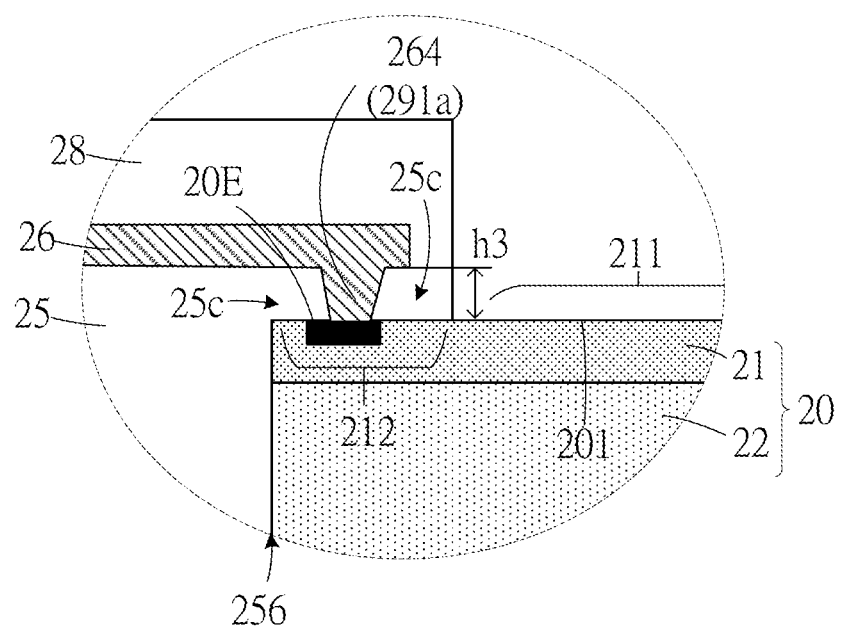

A cross-sectional view of the package structure of the sensing device 2 in the first embodiment of the present invention is shown in FIG. 4-1, in which the sensing device 2 includes a sensing chip 20, a dielectric layer 25, a first conductive wire layer 26, a second conductive wire layer 27, at least a conductive pillar 263, a plurality of conductive blind hole pillars 264 and 273, and a protective layer 28.

The positive pole area 21 of the sensing chip 20 is disposed above the negative pole area 22, and the active surface 201 of the positive pole area 21 is provided with a sensing region 211 and a metal pad region 212. The sensing region 211 is used to sense the external target, and the metal pad 20E arranged in the metal pad region 212 serves as the signal transmission interface of the sensing chip 20, and the upper surface of the metal pad 20E is flush with or concave in or convex in the upper surface of the active surface 201.

The dielectric layer 25 is disposed or formed around the sensing chip 20 to completely cover the periphery, back surface and a part of the active surface 201 of the sensing chip 20. Specifically, the first surface 254 of the dielectric layer 25 has an elevation higher than the active surface 201 of the sensing chip 20, and the height difference between them is h3 ranging from such as 5 μm to 15 μm. And as shown in the partial enlarged view in FIG. 4-2, the dielectric layer 25 is provided with an extension 25c having an elevation higher than the active surface 201 of the sensing chip 20, and the extension 25c of the dielectric layer 25 extends and covers the metal pad region 212 of the sensing chip 20 and the conductive blind hole pillar 264.

Since the extension 25c of the dielectric layer 25 has an elevation higher than the active surface 201 of the sensing chip 20 and covers the metal pad region 212, the dielectric layer 25 and the sensing chip 20 can be tightly combined thanks to the coating effect of the extension 25c. Except that the joint face 256 of the dielectric layer 25 and the sensing chip 20 will not be separated under the action of stress or thermal expansion and contraction of the dielectric material, the integrated package structure of the sensing device 2 will not have bending deformation.

In addition, since the joint face 256 will not be cracked under the stress or thermal expansion and contraction of dielectric material, and the first conductive wire layer 26 will not contact with the joint face 256 thanks to the supporting and blocking of the extension 25c of the dielectric layer 25, so the conductive material will not penetrate into the joint face 256 during the formation of the first conductive wire layer 26, thus avoiding the risk of short circuit between the positive pole area 21 and the negative pole area 22 of the sensing chip 20. The above is one of the main technical functions of the present invention.

The first conductive wire layer 26 of the sensing device 2 is disposed or formed on the first surface 254 of the dielectric layer 25, which is a patterned conductive layer with predetermined circuit pattern and includes at least two separated parts 261 and 262. Functionally, the first conductive wire layer 26 serves as the front-face circuit of the sensing device 2 to transmit signals from the positive pole area 21 of the sensing chip 20. And both parts 261 and 262 of the first conductive wire layer 26 do not cover the sensing region 211 of the sensing chip 20.

Similarly, the second conductive wire layer 27 is disposed or formed on the second surface 255 of the dielectric layer 25, which is also a patterned conductive layer and includes at least two separated parts 271 and 272. Functionally, the second conductive wire layer 27 serves as the back-face circuit of the sensing device 2 to transmit signals from the negative pole area 22 of the sensing chip 20.

The first conductive blind hole pillar 264 is disposed or formed between the 261 of the first conductive wire layer 26 and the metal pad 20E of the sensing chip 20 to serve as a front-face fan-out circuit of the positive pole area 21 of the sensing chip 20 to transmit the signal of the positive pole area 21 of the sensing chip 20 to the front-face circuit (i.e., the first conductive wire layer 26). In this embodiment, as shown in the partial enlarged view of FIG. 4-2, the first conductive blind hole pillar 264 is covered by the extension 25c of the dielectric layer 25.

On the other hand, the second conductive blind hole pillar 273 is disposed or formed between the 272 of the second conductive wire layer 27 and the negative pole area 22 on the back of the sensing chip 20. Therefore, the second conductive blind hole pillar 273 serves as a back-face fan-out circuit of the negative pole area 22 of the sensing chip 20 to transmit the signal of the negative pole area 22 of the sensing chip 20 to the back-face circuit (i.e., the second conductive wire layer 27).

Furthermore, the conductive pillar 263 is disposed or formed between the first conductive wire layer 26 and the second conductive wire layer 27 to serve as a transmission path between the front-face circuit and the back-face circuit of the sensing device 2 to transmit signals between these two layers.

Figures 1, 2:
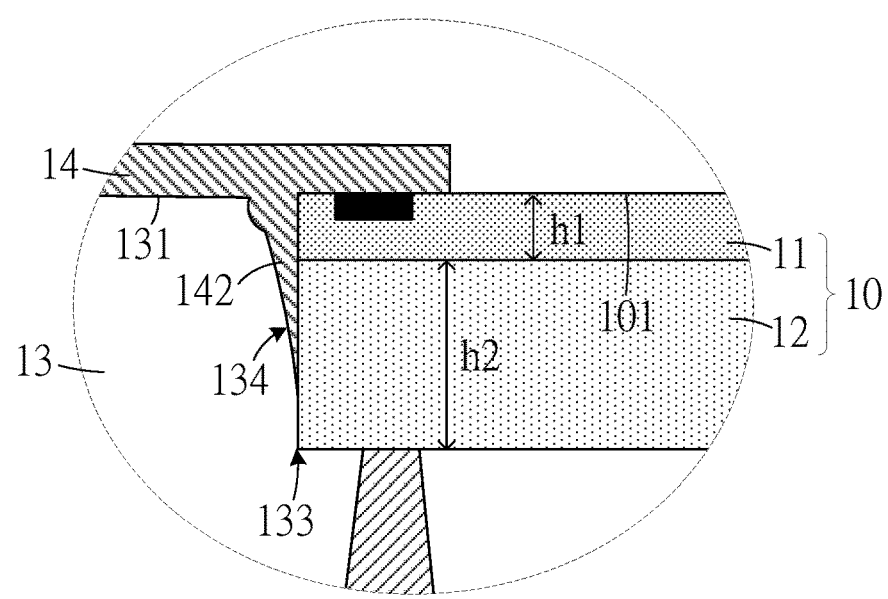

The protective layer 28 is disposed or formed on the first conductive wire layer 26 and the first surface 254 of the dielectric layer 25 to completely cover the 261 and 262 of the first conductive wire layer 26, and also the extension 25*c* of the dielectric layer on the side of the adjacent sensing region 211 (as shown in the partial enlarged view of FIG. 4-2). The protective layer 28 is provided with an opening 281 at the corresponding position above the sensing region 211 of the sensing chip 20 to expose the sensing region 211, and the protective layer 28 is made of soft material with greater toughness; therefore, the sensing device 2 is not easy to be broken by stress even under the condition of ultra-thin thickness.

Figures 1, 5:
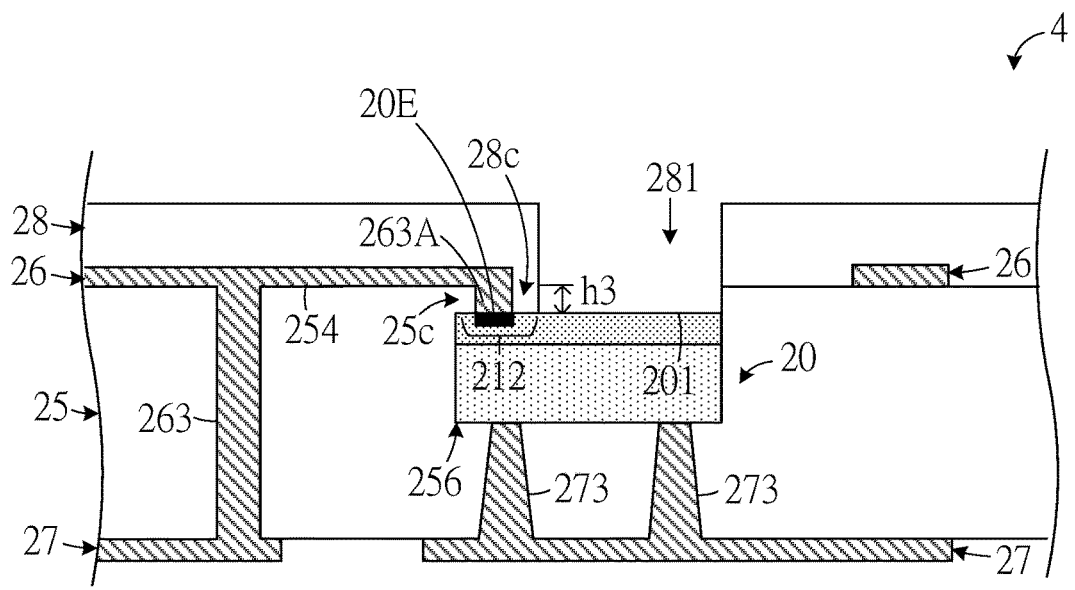
Figures 2, 5:
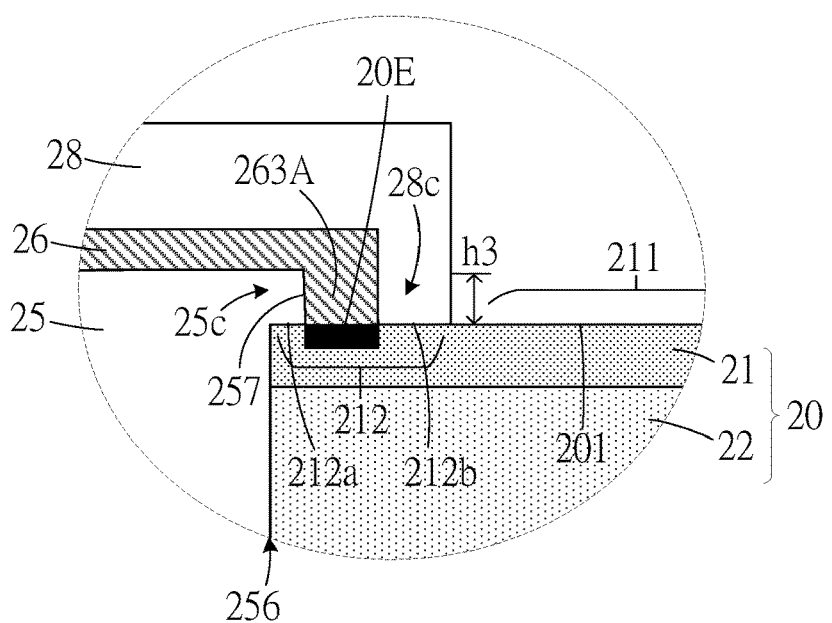

FIG. 5-1 is the cross-sectional view of the package structure of the sensing device 4 in the second embodiment of the present invention. As shown in FIG. 5-1, the arrangement position, material and function of each material layer or component of the sensing device 4 are identical or similar to each corresponding one of the sensing device 2 in the first embodiment, among which the conductive pillar 263A corresponds to the first conductive blind hole pillar 264 of the first embodiment.

The difference between the sensing device 2 of the present embodiment and that of the first embodiment is that, as shown in the partial enlarged view of FIG. 5-2, the extension part 25*c* of the dielectric layer 25 covers the edging area 212*a* of the metal pad region 212, while the extension part 28*c* of the protective layer 28 covers the metal pad region 212 and the molding area 212*b*.

Since the extension 25*c* of the dielectric layer 25 and the extension 28*c* of the protective layer 28 both have an elevation higher than the active surface 201 of the sensing chip 20, and the extension 25*c* and 28*c* cover the metal pad region 212 so that the dielectric layer 25 and the protective layer 28 cover the sensing chip 20 completely. In addition, the first conductive wire layer 26 will not contact with the joint face 256 thanks to the supporting and blocking of the extension 25*c* of the dielectric layer 25, therefore, not only the dielectric layer 25 and the sensing chip 20 can be closely combined so that the joint face 256 of the dielectric layer 25 and the sensing chip 20 will not be separated or cracked under the action of stress or thermal expansion and contraction of the dielectric material, but also the conductive material will not penetrate into the joint face 256 in the process of forming the first conductive wire, and also avoid the risk of short circuit between the positive pole area 21 and the negative pole area 22 of the sensing chip 20.

And another difference between the present embodiment and the sensing device 2 in the first embodiment is that the conductive pillar 263A is formed by extending vertically upward from the metal pad 20E along the side wall 257 of the dielectric layer 25 thanks to the supporting and blocking of the dielectric layer 25, and is connected to the first conductive wire layer 26 thereupon. Thus, the section shape of the conductive pillar 263A is a straight column, which is different from the conical column of the first conductive blind hole pillar 264 formed through filling the blind hole 253 in the first embodiment.

Moreover, the other difference is that one side (right side) of the conductive pillar 263A of the present embodiment is directly covered by the extension 28*c* of the protective layer 28, which is different from that of the first conductive blind hole pillar 264 (as shown in FIG. 4-2) of the first embodiment that both sides are directly covered by the extension 25*c* of the dielectric layer 25, not by the protective layer 28.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A sensing device, comprising:
   a sensing chip, which has an active surface and a back surface oppositely arranged, and the active surface is provided with a sensing region and a metal pad region provided with at least one metal pad thereon;
   a dielectric layer, which covers a periphery, the back surface, and a part of the active surface of the sensing chip, has a first surface and a second surface oppositely arranged, wherein the first surface has an elevation higher than the active surface of the sensing chip and exposes the sensing region of the sensing chip;
   a first conductive wire layer, which is disposed on the first surface of the dielectric layer;
   a second conductive wire layer, which is disposed on the second surface of the dielectric layer;
   at least a conductive pillar, which is disposed within the dielectric layer and connected to the first conductive wire layer and the second conductive wire layer; and
   at least a first conductive blind hole pillar, which is connected to the first conductive wire layer and the metal pad of the sensing chip.

2. The sensing device of claim 1, further comprises at least a second conductive blind hole pillar, which is disposed in the dielectric layer to connect the back side of the sensing chip and the second conductive wire layer.

3. The sensing device of claim 1, further comprises a protective layer, which is disposed on the first surface of the dielectric layer to cover the first conductive wire layer and expose the sensing region.

4. The sensing device of claim 1, wherein the metal pad and the metal pad region between the inner side of the metal pad and the sensing region are exposed to the first surface of the dielectric layer, and the metal pad region between the outer side of the metal pad and the edge of the active surface is covered by the dielectric layer.

5. The sensing device of claim 4, further comprises at least a back-face fan-out circuit, which is disposed within the dielectric layer to connect the back side of the sensing chip and the second conductive wire layer.

6. The sensing device of claim 4, further comprises a protective layer, which is disposed on the first surface of the dielectric layer to cover the first conductive wire layer and expose the sensing region.

7. The sensing device of claim 4, wherein the front-face fan-out circuit comprises at least a conductive pillar.

8. A manufacturing method of a sensing device, comprising:
   providing a sensing chip with a relatively arranged active surface and a back surface, the active surface is provided with a sensing region and a metal pad region having at least a metal pad thereon;
   disposing an adhesive layer on the active surface of the sensing chip to cover at least the sensing region;

disposing the sensing chip on a carrier through the adhesive layer, of which an upper surface is bonded to the carrier;

forming a dielectric layer on the carrier to cover the periphery, the back surface and a part of the active surface of the sensing chip, among which the dielectric layer is provided with relatively arranged a first surface and a second surface, the first surface is bonded to the carrier and is in common plane with the upper surface of the adhesive layer;

removing the carrier so that the first surface of the dielectric layer and the upper surface of the adhesive layer are exposed;

forming a first conductive wire layer on the first surface of the dielectric layer;

forming at least a front-face fan-out circuit between the first conductive wire layer and the metal pad of the sensing chip to connect the first conductive wire layer and the metal pad;

forming a second conductive wire layer on the second surface of the dielectric layer;

forming at least a conductive pillar between the first conductive wire layer and the second conductive wire layer to connect the first conductive wire layer and the second conductive wire layer; and removing the adhesive layer to expose at least the sensing region of the sensing chip, wherein the first surface of the dielectric layer has an elevation higher than the active surface of the sensing chip.

9. The manufacturing method of claim 8, wherein before forming the second conductive wire layer, further comprising:

forming at least a blind hole in the dielectric layer to expose a part of the back side of the sensing chip to the second surface; and forming a conductive blind hole pillar in the blind hole by electroplating to form a back-face fan-out circuit to connect the back surface with the second conductive wire layer.

10. The manufacturing method of claim 8, wherein forming the front-face fan-out circuit further comprising:

forming at least a blind hole in the dielectric layer to expose the metal pad in the metal pad region to the first surface; and forming a conductive blind hole pillar in the blind hole by electroplating to form the front-face fan-out circuit to connect the metal pad with the first conductive wire layer.

11. The manufacturing method of claim 8, wherein forming the conductive pillar further comprising:

forming at least a via hole in the dielectric layer to connect the first surface and the second surface; and forming the conductive pillar in the via hole by electroplating to connect the first conductive wire layer and the second conductive wire layer.

12. The manufacturing method of claim 8, wherein after the adhesive layer is removed, further comprising:

forming a protective layer on the first conductive wire layer to cover the first conductive wire layer and the first surface of the dielectric layer, and expose the sensing region of the sensing chip.

13. The manufacturing method of claim 8, wherein the adhesive layer further covers the metal pad of the sensing chip and the metal pad region between the inner side of the metal pad and the sensing region, which is removed before the first conductive wire layer is formed so as to expose the sensing region of the sensing chip, the metal pad and the metal pad region between the inner side of the metal pad and the sensing region, and the method for forming the front-face fan-out circuit further comprising:

forming the exposed metal pad by electroplating to form the conductive pillar to connect the metal pad with the first conductive wire layer.

14. The manufacturing method of claim 13, wherein before forming the second conductive wire layer, further comprising:

forming at least a blind hole in the dielectric layer to expose a part of the back side of the sensing chip to the second surface; and forming a conductive blind hole pillar in the blind hole by electroplating to form the back-face fan-out circuit to connect the back surface with the second conductive wire layer.

15. The manufacturing method of claim 13, wherein after the first conductive wire layer is formed, further comprising:

forming a protective layer on the first conductive wire layer to cover the first conductive wire layer, the front-face fan-out circuit, the first surface of the dielectric layer and the metal pad region between the inner side of the metal pad and the sensing region, and exposing the sensing region of the sensing chip.

* * * * *